Figure 1:
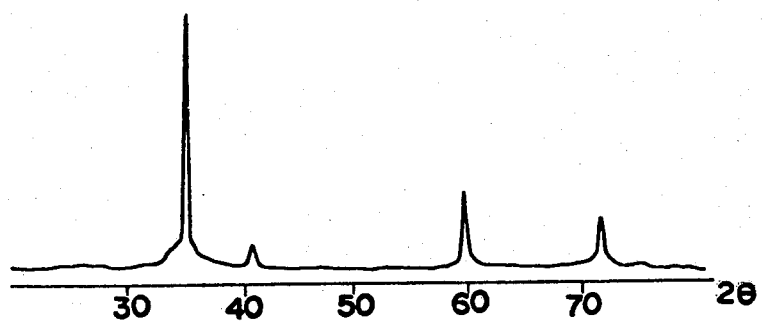

United States Patent [19]

Oohara et al.

[11] 4,126,652
[45] Nov. 21, 1978

[54] PROCESS FOR PREPARATION OF A METAL CARBIDE-CONTAINING MOLDED PRODUCT

[75] Inventors: Kunio Oohara; Tatsuhiko Shizuki; Hideyuki Mitamura; Masahiro Sugino, all of Otsu, Japan

[73] Assignee: Toyo Boseki Kabushiki Kaisha, Osaka, Japan

[21] Appl. No.: 771,985

[22] Filed: Feb. 25, 1977

[30] Foreign Application Priority Data

Feb. 26, 1976 [JP] Japan .................................. 51-20922
Jun. 6, 1976 [JP] Japan .................................. 51-80634

[51] Int. Cl.$^2$ ............................................. C04B 35/56
[52] U.S. Cl. ......................... 264/29.6; 106/43; 264/63; 264/65; 264/66; 264/182; 264/DIG. 19; 423/440; 423/447.5
[58] Field of Search .......... 264/63, 65, 29.1, DIG. 19, 264/182, 66, 29.6; 423/440, 447.5; 106/43

[56] References Cited

U.S. PATENT DOCUMENTS

| 3,403,008 | 9/1968 | Hamling | 423/440 |
| 3,917,776 | 11/1975 | Sato et al. | 264/29 |
| 3,923,950 | 12/1975 | Gump et al. | 264/29 |
| 4,006,211 | 2/1977 | Isley | 264/182 |
| 4,010,233 | 3/1977 | Winter et al. | 264/65 |

*Primary Examiner*—Robert F. White
*Assistant Examiner*—John A. Parrish
*Attorney, Agent, or Firm*—Birch, Stewart, Kolasch and Birch

[57] ABSTRACT

A process for preparation of a metal carbide-containing molded product which comprises heating a molded composition comprising at least one powdery metal selected from the group consisting of B, Ti, Si, Zr, Hf, V, Nb, Ta, Mo, W, Cr, Fe and U and having an average particle size of not more than about 50 $\mu$ and an acrylonitrile polymer at a temperature of about 200° to 400° C and then calcining the resulting product at a temperature of about 900° to 2500° C in an inert atmosphere.

13 Claims, 2 Drawing Figures

PROCESS FOR PREPARATION OF A METAL CARBIDE-CONTAINING MOLDED PRODUCT

The present invention relates to a process for preparing a molded product containing a metal carbide, which can be advantageously carried out in an installation comprising merely a conventional molding apparatus and a simple calcinating apparatus.

Molded products of metal carbides, especially fibers and films are excellent in various physical properties such as strength, modulus of elasticity, heat resistance, chemical stability and thermal conductivity, and their utilization as new industrial materials is highly expected. In particular, a great expectation is placed on their utilization as reinforcing fibers to be compounded with metals, plastics and ceramics. But, these molded products are very expensive so that their industrial utilization is delayed.

As conventional fibers containing metal carbides, there are known a product obtained by calcining polycarbosilane prepared from polysilane, a product obtained by subjecting a fiber mainly containing silicon dioxide to a reaction with carbon so as to form silicon carbide on its surface, a silicon carbide whisker, etc. These conventional products are not suitable for industrial mass production, because processes for their preparation are complicated or special apparatuses are required for their production.

According to the present invention, there is provided a process for preparation of a metal carbidecontaining molded product which comprises heating a molded composition comprising at least one powdery metal selected from the group consisting of B, Ti, Si, Zr, Hf, V, Nb, Ta, Mo, W, Cr, Fe and U and having an average particle size of not more than about 50μ and an acrylonitrile polymer at a temperature of about 200° to 400° C. and then calcining the resulting product at a temperature of about 900 to 2500° C. in an inert atmosphere.

In the said process, the molded composition can be produced with ease in a continuous state, and the treatment for its stretching can be effected under a good workability to increase the strength. By preparing the molded composition in such continuous form, continuous supply thereof into a furnace for heat treatment is made possible without any special apparatus, and the workability at the heat treatment step is excellent to afford the objective metal carbide-containing product in a continuous form such as filaments or a film. Thus, the production of the metal carbide-containing molded product is attained with ease in the combination of a conventional installation for preparation of a molded product of an acrylonitrile polymer and an installation for carbonization.

The powdery metal to be used in the invention (i.e. B, Ti, Si, Zr, Hf, V, Nb, Ta, Mo, W, Cr, Fe or U) is desired to have a purity of not less than about 50% by weight. It may contain carbon and/or various metal oxides as impurities. Its average particle size is not more than about 50μ, preferably not more than about 10μ. It may be used together with any conventional calcining aid such as an inorganic metal compound (e.g. $Al_2O_3$, $SiO_2$, $TiO_2$, MgO, $ZrO_2$, CaO) or an organic silicon compound (e.g. silicone oil, silicone resin, polysilane, polysilmethylene, polysilphenylene, poly(trimethylvinylsilane), poly(p-trimethylsilylstyrene)). The calcining aid is, if used, required to have an average size of not more than about 50μ. Its amount should not exceed about 100% by weight based on the weight of the powdery metal and is usually not more than about 10% by weight. By the use of the calcining aid, the resulting molded product will be improved in physical properties.

As the acrylonitrile polymer to be used in the invention, the one containing not less than about 80% by weight of units of acrylonitrile is favorable. When the acrylonitrile polymer is a copolymer, the other monomeric units may be the one(s) derived from any monomer(s) copolymerizable with acrylonitrile, of which preferred examples are acrylic acid and its esters such as methyl acrylate, ethyl acrylate, 2-chloroethyl acrylate, 2-hydroxy-3-chloropropyl acrylate, 2,3-dibromopropyl acrylate, tribromophenyl acrylate, 2-hydroxyethyl acrylate, 2-methoxyethyl acrylate, methoxypolyoxyethylene acrylate and N,N-dimethylaminoethyl acrylate, methacrylic acid and its esters corresponding to the above mentioned acrylic acid esters, derivatives of acrylic acid esters such as methyl 2-hydroxymethylacrylate and methyl 2-hydroxymethylmethacrylate, itaconic acid and its ester derivatives, allylamine and its derivatives, diallylamine and its derivatives, phosphorus-containing monomers such as dimethyl 2-cyano-1-methylallylphosphonate, dimethyl 2-cyano-allylphosphonate and dimethyl 2-ethoxycarbonyl allylphosphonate, styrene and its derivatives such as sodium p-styrenesulfonate, chloromethylstyrene and 1-methylstyrene, vinyl acetate, acrylamide, dimethylacrylamide, diacetacrylamide, methyl vinyl ketone, methyl isopropenyl ketone, methacrylonitrile, vinylidene cyanide, 1-cyanovinyl acetate, 2-hydroxymethylacrylonitrile, 2-acetylaminomethylacrylonitrile, 2-methoxymethylacrylonitrile, 2-(1-hydroxyethyl)acrylonitrile, 2-ethoxymethylacrylonitrile, vinylidene chloride, vinyl bromide, sodium allylsulfonate, sodium methallylsulfonate, allyl alcohol, methallyl alcohol, etc.

The molecular weight of the acrylonitrile polymer is usually in a range of about 30,000 to 300,000. More particularly, it may be preferably chosen in such a manner that the viscosity at the molding step becomes from about 50 to 10,000 poise, though the value is varied depending on the proportion of the powdery metal in the solid components mainly consisting of the acrylonitrile polymer and the powdery metal and the total concentration at the molding step. In case of molding in solution with a solid concentration of about 10% by weight, for example, the desirable molecular weight is from about 30,000 to 100,000 when the proportion of the powdery metal is 5 to 30% by weight, from about 50,000 to 150,000 when the proportion is 30 to 70% by weight, and from about 100,000 to 300,000 when the proportion is from about 70 to 90% by weight.

For increasing the content of the metal carbide in the final product, the proportion of the powdery metal is desired to be about 5 to 90% by weight, preferably about 10 to 70% by weight. When the amount of the carbon produced from the acrylonitrile polymer by the calcination is larger than the equivalent amount to the powdery metal, the final metal carbide-containing product includes carbon. When it is smaller than the equivalent amount, the final metal carbide-containing product includes metal. By employing nitrogen as the calcination atmosphere in the latter case, the metal becomes metal nitride. The proportion of the powdery metal and the acrylonitrile polymer to be stoichiometrically equivalent is varied with the kind of the powdery metal and the yield of carbonization on the calcination of the acrylonitrile polymer. When, for instance, the acrylonitrile polymer is polyacrylonitrile, the weights of the acrylonitrile polymer and Si may be nearly equal for production of a SiC fiber, and the proportion of the acrylonitrile polymer and B may be 36:64 by weight for production of a $B_4C$ fiber. But, the precise proportion may be decided by further taking into consideration the calcination conditions, the composition of the acrylonitrile polymer, etc.

The preparation of the molded composition may be carried out, for instance, by any one of the following procedures: a procedure which comprises subjecting a monomer mixture mainly comprising acrylonitrile to solution polymerization with addition of the powdery metal prior to, in the course of or after the polymerization so as to disperse it into the polymerization mixture, or alternatively dispersing the powdery metal into a solution of the acrylonitrile polymer in a suitable solvent, and then subjecting the thus obtained powdery metal-containing mixture to molding by a conventional dry or wet method; a procedure which comprises admixing well the powdery acrylonitrile polymer with the powdery metal while adding an appropriate amount of water thereto and subjecting the mixture to melt extrusion (cf. Japanese Patent Publication (unexamined) No. 49839/1973), etc. Among them, a procedure wherein a dispersion of the powdery metal in a mixture of a solvent and a monomer is subjected to polymerization is the most preferable, because the molded composition is excellent in evenness and the final product therefrom has superior physical properties.

As the solvent for the acrylonitrile polymer, there may be employed any one being inactive to the powdery metal. For example, an organic solvent such as dimethylsulfoxide, dimethylsulfone, ethylmethylsulfone, sulforane, dimethylformamide, dimethylacetamide, N-methylpyrrolidone, hexamethylphosphorylamide, or ethylene carbonate may be used in case of the dry molding. When the wet molding method is adopted, a concentrated aqueous solution of zinc chloride, a concentrated aqueous solution of rhodanate and concentrated nitric acid as inorganic solvents may be exemplified in addition to the above mentioned organic solvents.

The composition mainly comprising the acrylonitrile polymer and the powdery metal may be subjected to molding by a wet, dry or air gap method conventionally adopted for molding of acrylonitrile polymers. In case of using dimethylformamide, dimethylacetamide or the like as the solvent for the acrylonitrile polymer, the dry method is favorable from the viewpoint of the recovery of the solvent. In case of employing dimethylsulfoxide, the wet or air gap method may be adopted by the use of an aqueous solution of dimethylsulfoxide, an aqueous solution of an inorganic salt, an aliphatic alcohol or the like as the coagulation bath. In case of using a concentrated aqueous solution of zinc chloride, a concentrated aqueous solution of rhodanate or concentrated nitric acid, the wet or air gap molding may be effected by the use of an aqueous solution of such salt in a concentration of about 20 to 30% as the coagulation bath. The conditions in the spinning may be the same as in the production of a conventional molded product of polyacrylonitrile. By any procedure, a molded product in a continuous form can be obtained, and its strength is increased by conventional stretching. When the particle size of the powdery metal is more than about 50μ, the workability at the molding and stretching is lowered, and snapping of yarns in case of the production of a fiber or formation of holes in case of the production of a film may be caused frequently.

The thus obtained molded composition is made infusible by heat treatment, preferably in an oxidizing atmosphere such as air at a temperature of about 200° to 400° C. (favorably about 250° to 350° C.) and then subjected to calcination of an inert atmosphere at a temperature of about 900° to 2500° C. (preferably about 1100° to 1800° C.). Prior to the heat treatment for infusibility, the molded product may be impregnated with a suitable antioxidant or flame-resistant. For the heat treatment for infusibility and the calcination, a conventional furnace for carbonization of molded products of acrylonitrile polymers may be employed. When the molded product is directly subjected to the calcination without passing through the heat treatment for infusibility, the final product loses the pliability to become fragile, or in case of a fiber, melt adhesion between single yarns takes place to cause troubles on the use. At a temperature lower than about 200° C., the effect of the heat treatment for infusibility is insufficient. At a temperature higher than about 400° C., the powdery metal-containing molded product may burn to cause deformation.

As the oxidizing atmosphere, the air is the most economical. By addition of a small amount of hydrogen chloride to the air, the yield of carbonization is advantageously increased. The heat treatment for infusibility is preferably effected at least for about 5 minutes. The time for the calcination is desired to be from about 3 minutes to 20 hours. While the heat treatment for infusibility is preferably carried out in an oxidizing atmosphere, it may be effected in an inactive atmosphere depending on the kind of the powdery metal. As the inactive atmosphere, argon or nitrogen is usually employed. But, in case of using nitrogen, metal nitride may be sometimes produced as mentioned above.

In the heat treatment for infusibility and the calcination, it is favored to place the molded product under a tension for enhancing the physical property. In case of a fiber, a tension of about 0.001 to 3 g/d is suitable. In case of a film, the nearly equal tension may be applied.

According to the present invention, the metal carbide-containing molded products can be obtained with great ease and low cost in comparison with the conventional methods. They are utilizable, solely or in combination with other materials, for a wide range of uses such as reinforcing fibers for metals and plastics, various thermal resistant materials, electrical uses by utilizing the change of the electric resistance depending on the proportion of the metal, the metal carbide and the metal nitride (e.g. heater, light-emitting material), abrasives by utilizing their moduluses, sliding materials by utilizing their low friction coefficients and materials for special adsorption.

Practical and presently preferred embodiments of the invention are illustratively shown in the following Examples wherein parts are by weight.

In these Examples, the composition of the final molded product is determined from the analytical values of total carbon, total nitrogen and total metal and the X-ray diffraction pattern.

EXAMPLE 1

Dimethylformamide (70 parts), metallic silicon (average particle size, 3μ or less; purity, 96% by weight) (15 parts) and polyacrylonitrile (molecular weight, about 100,000) (15 parts) are mixed together under stirring at 50° C. for several hours to obtain a dispersion having a viscosity of about 300 poise. This viscous liquid is spun up into a hot air-spinning tube at 200° to 250° C., and the solidified yarns are reeled off at a speed of 50 m/min, stretched about 3 times at 125° C. under pressure of steam and dried to obtain a metallic silicon-containing polyacrylonitrile fiber. The strength of the fiber is 4.1 t/cm$^2$, and the elongation is 10%.

Figure 2:
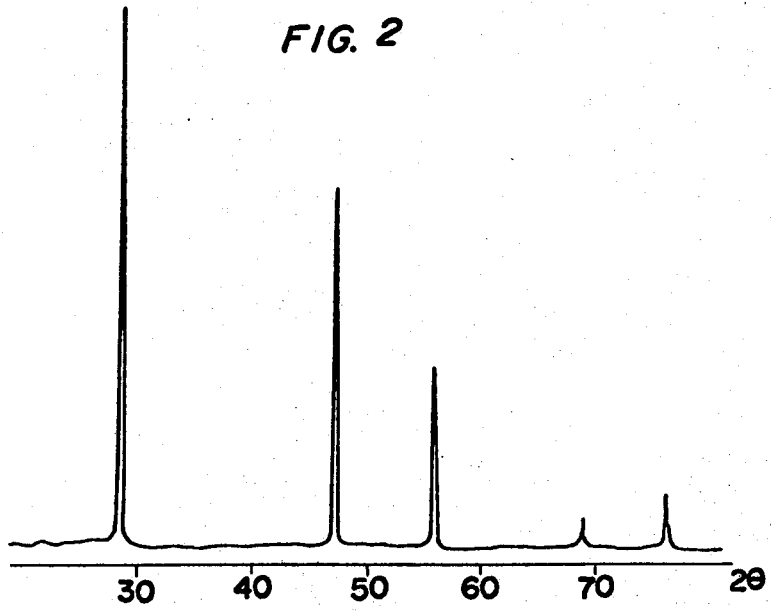

The thus obtained fiber is treated with the hot air of 200° to 350° C. for about 1 hour, and after gradual elevation of the temperature in the argon atmosphere, a heat treatment at 1300° C. is effected for about 1 hour to afford a fiber substantially consisting of silicon carbide. The strength of the fiber is 20 t/cm$^2$, and the modulus of elasticity is 2500 t/cm$^2$. The X-ray diffraction spectrum of the silicon carbide fiber thus produced is shown in FIG. 1. For comparison, the X-ray diffraction spectrum of the metallic silicon is shown in FIG. 2. Unreacted metallic silicon is not confirmed in the fiber.

water, stretched about 3 times under steam and dried to obtain a metallic silicon-containing polyacrylonitrile fiber.

Table 1

| Example No. | Acrylonitrile (part) | Metallic silicon (part) |
|---|---|---|
| 3 | 80 | 20 |
| 4 | 60 | 40 |
| 5 | 50 | 50 |
| 6 | 30 | 70 |
| 7 | 10 | 90 |

The thus obtained fiber is heated in the air at about 250° to 350° C. for 1 hour and then calcined in the argon atmosphere at about 1000° C. for 30 minutes and further at 1300° C. for 30 minutes. The rough estimation of the composition and the yarn quality of the resultant fiber are shown in Table 2 in which the properties of the fiber being in the stage after the stretching but before the heat treatment are also described.

Table 2

| | Composition after calcination (% by weight) | | | Yarn quality | | | |
|---|---|---|---|---|---|---|---|
| | | | | After stretching and drying | | After calcination | |
| Example No. | Silicon carbide | Metallic silicon | Carbon | Strength (t/cm$^2$) | Elongation (%) | Strength (t/cm$^2$) | Modulus of elasticity(t/cm$^2$) |
| 3 | 48 | 0 | 52 | 5.8 | 20 | 23 | 2050 |
| 4 | 81 | 0 | 19 | 4.9 | 16 | 24 | 2300 |
| 5 | 100 | 0 | 0 | 4.5 | 13 | 30 | 3200 |
| 6 | 59 | 41 | 0 | 3.7 | 7 | 25 | 2400 |
| 7 | 18 | 82 | 0 | 3.2 | 5 | 15 | 1900 |

EXAMPLE 2

Metallic silicon (particle size, 3µ or less; purity, 96% by weight) (10 parts) is dispersed into dimethylsulfoxide (70 parts), and acrylonitrile (18 parts) and methyl acrylate (2 parts) are added thereto. After further addition of 2,2'-azobis(2,4-dimethylvaleronitrile) (0.15 part) as the catalyst, the mixture is stirred at 50° C. for 6 hours in the stream of nitrogen to effect the polymerization. In the thus obtained viscous liquid, the total concentration of the metallic silicon and the polymer is 29.5%. This viscous liquid is, after defoaming, spun up into a 50% aqueous solution of dimethylsulfoxide at 5° C., and the obtained fiber is washed with water, stretched about 3 times in hot water and dried. The strength of the fiber is 5.7 t/cm$^2$, and the elongation is 17%.

The thus obtained fiber is heated in the air at about 250° C. to 300° C. for 1 hour and then calcined at 1400° C. for about 1 hour in the nitrogen atmosphere to obtain a fiber comprising about 70% by weight of silicon carbide and about 30% by weight of carbon. The strength of the fiber is 23 t/cm$^2$, and the modulus of elasticity is 2600 t/cm$^2$.

EXAMPLES 3 to 7

Into a 60% aqueous solution of zinc chloride (1800 parts), acrylonitrile is added in an amount as shown in Table 1, and ammonium persulfate in an amount of .1% by weight to acrylonitrile and sodium sulfite in an amount of 1.5% by weight to acrylonitrile as the catalysts are added thereto. The mixture is stirred at 150° C. for 2 hours to effect the polymerization. To the obtained solution, metallic silicon (average particle size, 1µ or less; urity, 99.9%) is added in an amount as shown in Table 1, and the mixture is stirred well. The resultant uniform mixture is, after defoaming, spun up into an aqueous solution of zinc chloride (about 30%) as the coagulation bath, and the obtained fiber is washed with The fibers after stretched and dried which are obtained in Examples 6 and 7 are treated in the same manner as in Examples 6 and 7 but employing an atmosphere of nitrogen in place of the argon atmosphere. The rough estimation of the compositions and the yarn qualities of the resultant fibers are shown in Table 3.

Table 3

| | Composition (% by weight) | | | Yarn quality | |
|---|---|---|---|---|---|
| Example No. | Silicon carbide | Metallic silicon | Silicon nitride | Strength (t/cm$^2$) | Modulus of elasticity (t/cm$^2$) |
| 6a (corresponding to Example 6) | 54 | — | 46 | 26 | 2500 |
| 7a (corresponding to Example 7) | 12 | — | 88 | 18 | 2100 |

COMPARATIVE EXAMPLE 1

The same procedure as in Example 1 is repeated but using metallic silicon having an average particle size of 80µ. The obtained liquid shows a viscosity of about 200 poise. When the liquid is subjected to spinning, snapping of yarns takes place frequently, and reeling can not be effected in practice.

EXAMPLE 8

Dimethylformamide (70 parts), non-crystalline boron (average particle size, 1µ or less; purity, 96% by weight) (19.2 parts) and polyacrylonitrile (molecular weight, about 100,000) (10.8 parts) are admixed well under stirring at 50° C. for several hours to obtain a dispersion having a viscosity of about 300 poise. This viscous liquid is spun up into a hot air-spinning tube at 200° to 250° C., and the solidified yarns are reeled off at a speed of 60 m/min, stretched about 3 times at 125° C. under pressure of steam and dried to obtain a metal boron-containing polyacrylonitrile fiber. The strength of the fiber is 3.8 t/cm$^2$, and the elongation is 12%.

The thus obtained fiber is treated with the hot air of 200° to 350° C. under a tension of about 0.05 g/d for about 1 hour, and after gradual elevation of the temperature in the argon atmosphere, a heat treatment at 1800° C. is effected for about 1 hour to afford a fiber substantially consisting of boron carbide. The strength of the fiber is 20 t/cm$^2$, and the modulus of elasticity is 2500 t/cm$^2$.

EXAMPLE 9

Metallic tungsten (particle size, 0.6μ or less; purity, 99.9% by weight) (15 parts) and zirconium dioxide (particle size, 1μ or less) (0.5 part) are dispersed into dimethylsulfoxide (70 parts), and acrylonitrile (14 parts) and methyl acrylate (2 parts) are added thereto. After further addition of 2,2'-bis(2,4-dimethylvaleronitrile) (0.08 part) as the catalyst, the mixture is stirred at 50° C. for 6 hours in the stream of nitrogen to effect the polymerization. In the thus obtained viscous liquid, the total concentration of the metallic tungsten and the polymer is 29.5%. This viscous liquid is, after defoaming, spun up into a 50% aqueous solution of dimethylsulfoxide at 5° C., and the obtained fiber is washed with water, stretched about 3 times in hot water and dried. The strength of the fiber is 5.7 t/cm$^2$, and the elongation is 17%.

The thus obtained fiber is heated in the air at about 250° C. to 300° C. under a tension of 0.05 g/d for 1 hour and then calcined at 1400° C. for about 2 hours in the nitrogen atmosphere to obtain a fiber comprising about 70% by weight of tungsten carbide and about 30% by weight of carbon. The strengh of the fiber is 13 t/cm$^2$, and the modulus of elasticity is 1600 t/cm$^2$.

EXAMPLES 10 to 14

Into a 60% aqueous solution of zinc chloride (900 parts), acrylonitrile is added in an amount as shown in Table 4, and ammonium persulfate in an amount of 1% by weight to acrylonitrile and sodium sulfite in an amount of 1.5% by weight to acrylonitrile as the catalysts are added thereto. The mixture is stirred at 15° C. for 2 hours to effect the polymerization. To the obtained solution, noncrystalline boron (average particle size, 1μ or less; purity, 90%) in an amount as shown in Table 4 and alumina sol in an amount of 2% by weight (as alumina) to boron are added, and the mixture is stirred well. The resultant uniform mixture is, after defoaming, spun up into an aqueous solution of zinc chloride (about 30%) as the coagulation bath, and the obtained fiber is washed with water, stretched about 3 times under steam and dried to obtain a metallic boron-containing polyacrylonitrile fiber.

Table 4

| Example No. | Acrylonitrile (part) | Metallic boron (part) |
|---|---|---|
| 10 | 80 | 20 |
| 11 | 50 | 50 |
| 12 | 36 | 64 |
| 13 | 30 | 70 |
| 14 | 10 | 90 |

The thus obtained fiber is heated in the air at about 250° to 350° C. under a tension of about 0.03 g/d for 1 hour and then calcined in the argon atmosphere at about 1000° C. for 30 minutes and further at 1800° C. for 30 minutes. The rough estimation of the composition and the yarn quality of the resultant fiber are shown in Table 5 in which the properties of the fiber being in the stage after the stretching but before the heat treatment are also shown.

Table 5

| | Composition after calcination (% by weight) | | | Yarn quality | | | |
|---|---|---|---|---|---|---|---|
| | | | | After stretching and drying | | After calcination | |
| Example No. | Boron carbide (B$_4$C) | Metallic boron | Carbon | Strength (t/cm$^2$) | Elongation (%) | Strength (t/cm$^2$) | Modulus of elasticity (t/cm$^2$) |
| 10 | 43 | 0 | 57 | 5.8 | 20 | 23 | 2050 |
| 11 | 85 | 0 | 15 | 4.9 | 16 | 20 | 2300 |
| 12 | 100 | 0 | 0 | 4.5 | 13 | 20 | 2300 |
| 13 | 81 | 19 | 0 | 3.7 | 7 | 15 | 1700 |
| 14 | 24 | 76 | 0 | 3.2 | 5 | 10 | 900 |

The fibers after stretched and dried which are obtained in Examples 13 and 14 are treated in the same manner as in Examples 13 and 14 but employing an atmosphere of nitrogen in place of the argon atmosphere. The rough estimation of the compositions and the yarn qualities of the resultant fibers are shown in Table 6.

Table 6

| | Composition (% by weight) | | | Yarn quality | |
|---|---|---|---|---|---|
| Example No. | Boron carbide | Metallic boron | Boron nitride | Strength (t/cm$^2$) | Modulus of elasticity (t/cm$^2$) |
| 13a (corresponding to Example 13) | 64 | — | 36 | 15 | 1500 |
| 14a (corresponding to Example 14) | 12 | — | 88 | 10 | 1200 |

COMPARATIVE EXAMPLE 2

The same procedure as in Example 8 is repeated but using crystalline boron having an average particle size of 80μ. The obtained liquid shows a viscosity of about 200 poise. When the liquid is subjected to spinning, snapping of yarns takes place frequently, and reeling can not be effected in practice.

EXAMPLES 15 to 23

Into a 60% aqueous solution of zinc chloride (1900 parts), acrylonitrile is added in an amount as shown in Table 7, and ammonium persulfate in an amount of 1% by weight to acrylonitrile and sodium sulfite in an amount of 1.5% by weight to acrylonitrile as the catalysts are added thereto. The mixture is stirred at 15° C.

for 2 hours to effect the polymerization. To the obtained solution, a powdery metal (average particle size, 1μ or less) in an amount as shown in Table 7 is added, and the mixture is stirred well. The resultant uniform mixture is, after defoaming, spun up into an aqueous solution of zinc chloride (about 30%) as the coagulation bath by the air gap method, and the obtained fiber is washed with water, stretched about 3 times under steam and dried to obtain a metal-containing polyacrylonitrile fiber.

Table 7

| Example No. | Acrylonitrile (part) | Powdery metal Kind | Amount (part) |
|---|---|---|---|
| 15 | 33 | Ti | 67 |
| 16 | 21 | Zr | 79 |
| 17 | 20 | Mo | 80 |
| 18 | 32 | V | 68 |
| 19 | 12 | Ta | 88 |
| 20 | 12 | Hf | 88 |
| 21 | 21 | Nb | 79 |
| 22 | 30 | Fe | 70 |
| 23 | 32 | Cr | 68 |

The thus obtained fiber is heated in the air at about 200° to 300° C. for 30 minutes, and after gradual elevation of the temperature in the argon atmosphere, a heat treatment at a temperature of 1000° to 1800° C. depending upon the kind of the metal is effected for about 1 hour. The thus obtained fiber consists of the respective metal carbide in a content of not less than about 90% by weight. The yarn quality of the resultant fiber is shown in Table 8.

Table 8

| Example No. | Kind of carbide | Yarn quality Strength (t/cm²) | Modulus of elasticity (t/cm²) |
|---|---|---|---|
| 15 | TiC | 15 | 1800 |
| 16 | ZrC | 13 | 1100 |
| 17 | MoC | 18 | 1500 |
| 18 | VC | 15 | 1300 |
| 19 | TaC | 12 | 1800 |
| 20 | HfC | 8 | 950 |
| 21 | NbC | 10 | 1100 |
| 22 | FeC | 9 | 890 |
| 23 | CrC | 7 | 900 |

EXAMPL 24

Into a 60% aqueous solution of zinc chloride (180 parts), acrylonitrile (5.8 parts) is added, and ammonium persulfate in an amount of 1% by weight to acrylonitrile and sodium sulfite in an amount of 1.5% by weight to acrylonitrile as the catalysts are added thereto. The mixture is stirred at 10° C. for 3 hours to effect the polymerization. To the obtained solution, metallic tungsten (average particle size, 0.6μ or less) (8.8 parts) and metallic silicon (average particle size, 1.0μ or less) (5.4 parts) are added, and the mixture is stirred well. The resultant uniform mixture is, after defoaming, spun up into an aqueous solution of zinc chloride (about 30%) as the coagulation bath by the air gap method, and the obtained fiber is washed with water, stretched about 3 times under steam and dried to obtain a metal-containing polyacrylonitrile fiber. The strength of the fiber is 3.0 t/cm², and the elongation is 15%. The fiber is treated with the air at a temperature of about 200° to 300° C. for 30 minutes and calcined in the argon atmosphere at 1300° C. for 30 minutes and at 1400° C. for 30 minutes to give a fiber substantially consisting of tungsten carbide and silicon carbide. The strength of the fiber is 13.5 t/cm², and the modulus of elasticity is 1500 t/cm⁵.

What is claimed is:

1. A process for the preparation of a metal carbide-containing molded product which comprises heating a molded composition comprising at least one powdery metal selected from the group consisting of B, Ti, Si, Zr, Hf, V, Nb, Ta, Mo, W, Cr, Fe and U and having an average particle size of not more than about 50μ and an acrylonitrile polymer at a temperture of about 200° to 400° C. and then calcining the resulting product at a temperature of about 900° to 2500° C. in an inert atmosphere, said powdery metal being present in an amount of from about 5 to 90% by weight based on the total weight of the acrylonitrile polymer and the powdery metal.

2. The process according to claim 1, wherein the heating of the molded composition is carried out in an oxidizing atmosphere.

3. The process according to claim 2, wherein the oxidizing atmosphere is air.

4. The process according to claim 1, wherein the particle size of the powdery metal is not more than about 10μ.

5. The process according to claim 1, wherein the amount of the powdery metal is from about 10 to 70% by weight based on the total weight of the acrylonitrile polymer and the powdery metal.

6. The process according to claim 1, wherein the molded composition further comprises a calcining aid.

7. The process according to claim 1, wherein the molded composition is in the form of fiber or film.

8. The process according to claim 1, wherein the heating and/or the calcining are carried out on the molded composition in the form of fiber or film under a tension.

9. A process for the preparation of a metal carbide-containing molded product which comprises forming a molded composition comprising at least one powdery metal selected from the group consisting of B, Ti, Si, Zr, Hf, V, Nb, Ta, Mo, W, Cr, Fe, and U, having an average particle size of not more than about 50 microns and an acrylonitrile polymer, heating said molded composition at a temperature of about 200° to 400° C., and then calcining the resulting product at a temperature of about 900° to 2500° C. in an inert atmosphere to directly form said metal carbide-containing molded product, said powdery metal being present in an amount of from about 5 to 90% by weight based on the total weight of the acrylonitrile polymer and the powdery metal.

10. The process of claim 9, wherein the molded composition is formed by subjecting a monomer mixture mainly comprising acrylonitrile to solution polymerization with the addition of the powdery metal thereto either in the course of the polymerization or after the polymerization so as to disperse said powdery metal into the polymerization mixture.

11. The process of claim 9, wherein the molded composition is formed by dispersing the powdery metal into a solution of the acrylonitrile polymer in a suitable solvent, and then subjecting the thus obtained powdery metal-containing mixture to molding.

12. The process of claim 9, wherein the molded composition is formed by admixing powdery acrylonitrile polymer with the powdery metal while adding an appropriate amount of water thereto, and subjecting the mixture to melt extrusion.

13. The process of claim 9, wherein the molded product is placed under tension during heat treatment and calcination to enhance the physical properties thereof.

* * * * *